T. J. BRAY.
Coupling for Pipe, &c.

No. 218,701. Patented Aug. 19, 1879.

Witnesses.
Rich'd C. Wrenshall
Jno. K. Smith

Inventor.
Thomas J. Bray
by Bakewell & Kerr
Att'ys

UNITED STATES PATENT OFFICE.

THOMAS J. BRAY, OF PITTSBURG, PENNSYLVANIA.

IMPROVEMENT IN COUPLINGS FOR PIPES, &c.

Specification forming part of Letters Patent No. 218,701, dated August 19, 1879; application filed June 27, 1879.

*To all whom it may concern:*

Be it known that I, THOMAS J. BRAY, of Pittsburg, in the county of Allegheny and State of Pennsylvania, have invented a new and useful Improvement in Couplings for Pipe, Oil-Well Tubing, &c.; and I do hereby declare the following to be a full, clear, and exact description thereof, reference being had to the accompanying drawings, forming part of this specification, in which—

Figure 1:
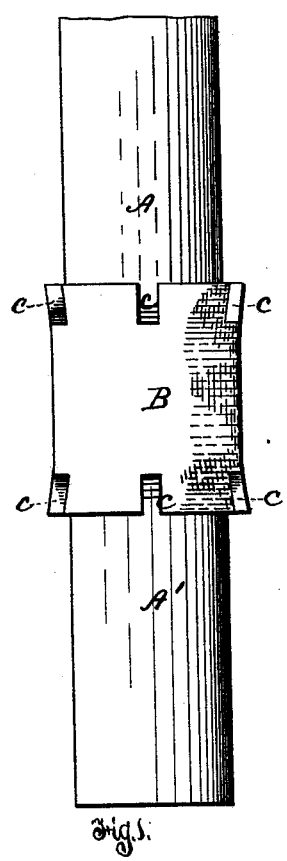
Figure 2:
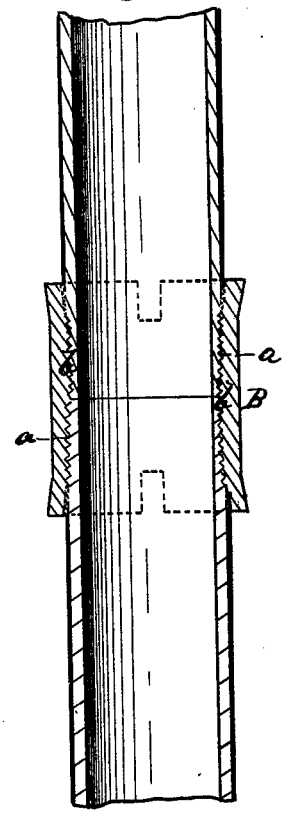
Figure 3:
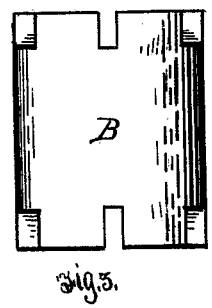

Figure 1 is an elevation of sections of pipe connected by a socket or coupling embodying my invention. Fig. 2 is a sectional view of the same. Fig. 3 is a detached view of the coupling or socket.

Like letters refer to like parts wherever they occur.

My invention relates to couplings for pipe, oil-well, steam, and other tubing; and consists in providing the coupling, which is threaded throughout its interior, with a series of slots intersecting the threads, and which permit the ends of the coupling to spring, give, or expand, whereby all the threads of the pipe are utilized, the coupling adjusts itself to the pipe, so as to insure a good fit and tight joint, and so embraces the pipe above the threads as to prevent any liability of the tubing breaking off at its weakest point—viz., where the thread terminates.

Where great lengths of pipe are employed—as, for instance, in tubing oil and other wells—there exists a tendency of the tubing to part at the weakest point, which experience has shown to be at or near some one of the couplings, and at the shoulder or point where the thread on the end of the pipe terminates. This tendency of the tubing to part is believed to be due to the weight and vibration of the tubing and the projection of the threaded portion of the tubing beyond the coupling, so that great strain is brought on the unsupported tubing at a point or points already weakened by the cutting of the thread.

To overcome this objection several constructions of couplings, &c., have been devised—as, for instance, the formation of a sleeve or the removal of a portion of the thread at the ends of the coupling, so as to allow the unthreaded portion of the coupling to extend beyond the threaded portion and embrace the unthreaded portion of the tubing. This, however, is objectionable as not calculated to make a good fit or tight joint unless the parts are more carefully and skillfully prepared than can be readily done in the manufacture of such articles, and as only in a measure remedying the difficulty, as it simply transfers the point of strain from the exterior to the interior of the coupling, the coupling simply supporting, not bracing or clamping, the tubing at its weakest point.

A second method that has heretofore been employed has been to reduce the length of the threaded portion of the tubing, (or, its equivalent, increase the length of the coupling,) and to increase the internal diameter of the coupling for a short distance from either end, partially cutting away the threads at such points, so as to leave only half-threads, which, when the pipe was screwed into the coupling, embedded themselves, biting a slight thread of their own on the unthreaded portion of the tubing. This device, while it supported the weak point of the tubing by transferring the same to a point within the coupling and was capable of forming a water-tight joint, did not clamp or embrace the tubing with a yielding pressure, so as to adjust itself and insure a good fit, and therefore demanded more care and skill in the production than can be conveniently and profitably bestowed on such articles.

A third construction has been to form the coupling with a sleeve or smooth socket at each end of the coupling of an internal diameter equal to the external diameter of the unthreaded portion of the pipe or tubing with which the coupling is to be used, so as to support the tubing above the threaded portion and prevent its breaking off at the termination of the thread, and this unthreaded portion of the coupling has been slotted to give it expansibility, so that the coupling could conform to any inequalities on the pipe or tubing. The main objection to such a construction is the labor and cost of manufacturing the same with sufficient accuracy of finish to insure the smooth or unthreaded portion of the coupling forming a good joint with the tubing or pipe, and a secondary objection is that the strain on the tubing is not materially diminished, but only transferred to a point within the coupling, as the smooth slotted portion of the coupling will allow of the play of tubing within the coupling as far down as the termination of the thread.

The object of the present invention is to overcome the several objections specified and provide an effective and readily-produced coupling which can be manufactured without special care and skill, which will clamp and embrace the pipe above the shoulder or termination of the thread, so as to insure it against breaking, and which, by its expansibility, will adjust itself to the pipe, insuring thereby a good fit and tight joint under all circumstances.

I will now proceed to describe my invention, so that others skilled in the art to which it appertains may apply the same.

In the drawings, A A' indicate portions of pipe or tubing which taper slightly and are threaded at *a a*, or constructed in the usual manner. B indicates the socket or coupling, which may be of equal interior diameter throughout, or may taper as shown in the drawings, according to the desire of the manufacturer, the taper not being essential to the operation of the coupling. This coupling is threaded on its interior, at *b*, as usual.

In order to render the coupling expansible, I slot the same at several points on the ends, as shown at *c c*, the slots intersecting the threads of the coupling, and the length of the slots depending on the degree of expansibility desired in the ends of the coupling and the extent to which it is desired it shall embrace the unthreaded portion of the pipe or tubing. This slotting of the ends of the coupling will permit the coupling to expand, thus facilitating the introduction of the end of the tubing and the proper engaging of the threads, and when the pipe is screwed in the desired distance the slotted threaded end of the coupling will clamp or gripe the unthreaded portion of the pipe, so as to firmly support the pipe at all times, and will adjust itself so as to insure a perfect joint.

As the slotted or expansible portion of the coupling is threaded, as well as the body of the coupling, the sharp edge of the thread will insure a perfect though yielding contact with the unthreaded portion of the tubing, and a close joint can be obtained without special care in manufacturing, as it is much easier to form a thread in the coupling than to accurately finish the sleeve or unthreaded portion of a coupling.

I am aware that a coupling having at each end an unthreaded portion whose internal diameter corresponded with the external diameter of the tubing used therewith has heretofore been devised, and also that said unthreaded portion of the coupling has been slotted to permit the coupling to yield and accommodate itself to any inequalities in the diameter of the pipe or tubing, and do not claim a coupling so constructed; but,

Having thus described the nature and advantages of my invention, what I claim, and desire to secure by Letters Patent, is—

A coupling for pipe, tubing, &c., threaded upon its interior and having at its ends a series of slots, which intersect the threads of the coupling, substantially as and for the purpose specified.

In testimony whereof I, the said THOMAS J. BRAY, have hereunto set my hand.

THOS. J. BRAY.

Witnesses:
F. W. RITTER, Jr.,
JAMES H. PORTE